F. C. LEFFLER.

Wheel-Cultivator.

No. 48,959.

Patented July 25, 1865.

Witnesses:
Wm. T. McNamara
J. T. Hall

Inventor:
F. C. Leffler
Per Munn & Co., Attys

United States Patent Office.

FREDERICK C. LEFFLER, OF HIGHLAND TOWNSHIP, WASHINGTON COUNTY, IOWA.

IMPROVEMENT IN CULTIVATORS.

Specification forming part of Letters Patent No. 48,959, dated July 25, 1865.

*To all whom it may concern:*

Be it known that I, FREDERICK C. LEFFLER, of Highland township, in the county of Washington and State of Iowa, have invented a new and Improved Cultivator; and I do hereby declare that the following is a full, clear, and exact description thereof, which will enable others skilled in the art to make and use the same, reference being had to the accompanying drawings, making a part of this specification, in which—

Figure 1:
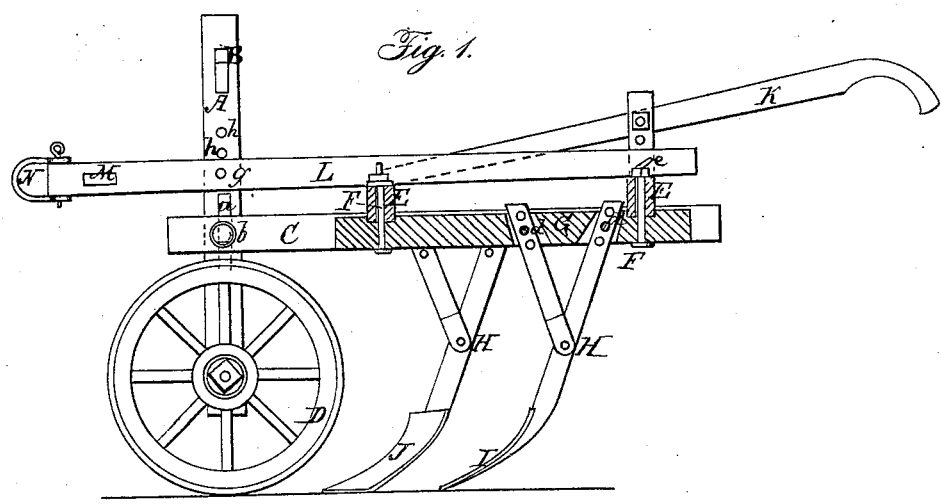
Figure 2:
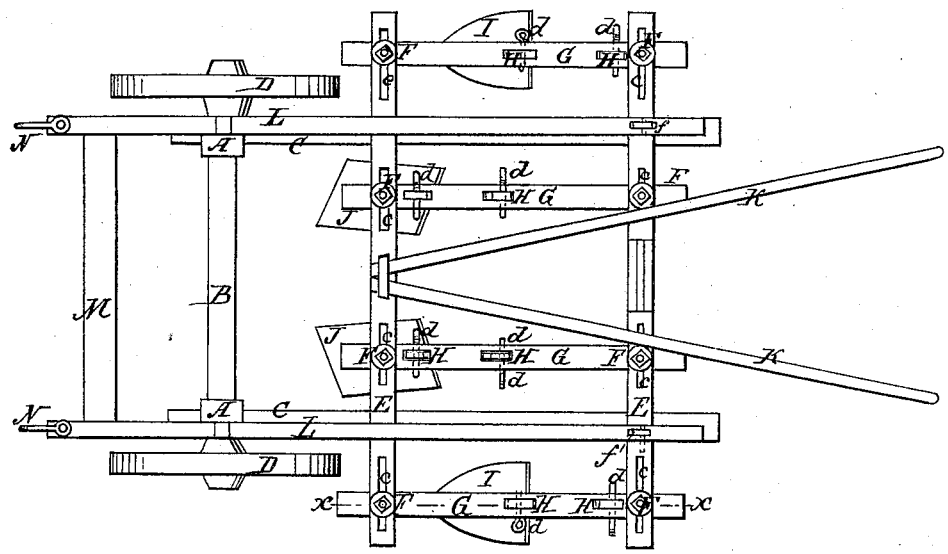

Figure 1 is a side sectional view of my invention, taken in the line $x\ x$, Fig. 2; Fig. 2, a plan or top view of the same.

Similar letters of reference indicate like parts.

This invention relates to a new and improved cultivator, designed to be drawn by two horses and for the cultivation of those crops which are grown in hills or drills.

The invention consists in a novel manner of applying the wheels to the machine, whereby the depth of the penetration of the plows in the earth may be regulated as desired.

This invention also consists in a novel and improved means for regulating the draft-bars, and also in an improved construction of the framing of the machine, whereby the plows may be adjusted at a greater or less distance apart, as may be desired.

A A represent two upright bars, the upper ends of which are connected by a cross-bar, B. These upright bars have vertical slots $a$ made in them, through which bolts $b$ pass, said bolts also passing through horizontal parallel bars C C.

To the lower part of each bar A a wheel, D, is attached, and to the bars C C there are secured transversely and permanently two bars, E E, which have longitudinal slots $c$ made in them for screw-bolts F to pass through, said bolts securing beams G to the bars E. These beams G are plow-beams. They are all back of the wheels D D, and have standards H attached to them by pins $d$, which pass through any of a series of holes in said standards to admit of them being adjusted higher or lower, as desired. The standards of the outer plow-beams G have ordinary shovel-shares, I, attached to them, and the standards of the inner beams G, which are a trifle in advance of others, have diamond-shaped plows J attached to them.

K K are handles attached to the bars E E, and L L are two bars, which are secured at their back ends by pivots $e$ to small uprights $f$ on the rear bar, E. These bars L L extend a trifle beyond the upright bars A A, and they are connected at their fronts ends by a cross-bar, M. The bars L have each a clevis, N, attached to their front ends, and said bars may, at their front ends, be adjusted higher or lower by means of a rod, $g$, passing through any of a series of holes, $h$, in the upright bars A.

From the above description it will be seen that the plows may, by adjusting the bars C C higher or lower, be made to penetrate into the earth at a greater or less depth, as may be desired, the plows also adjusted at a greater or less distance apart, and the line of draft regulated as occasion may require.

Having thus described my invention, I claim as new and desire to secure by Letters Patent—

The draft-bars L, attached to the rear bar, E, by pivots $e$, and uprights $f$, and secured to the upright bars A by a rod, G, substantially as and for the purpose set forth.

FREDERICK C. LEFFLER.

Witnesses:
GEO. F. JOHNSON,
PAUL LECKLITNER.